(12) United States Patent
Peng

(10) Patent No.: US 12,236,618 B2
(45) Date of Patent: Feb. 25, 2025

(54) PHOTOGRAPHING METHOD AND ELECTRONIC DEVICE

(71) Applicant: VIVO MOBILE COMMUNICATION CO., LTD., Dongguan (CN)

(72) Inventor: Guilin Peng, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 347 days.

(21) Appl. No.: 17/752,831

(22) Filed: May 24, 2022

(65) Prior Publication Data

US 2022/0292696 A1 Sep. 15, 2022

Related U.S. Application Data

(63) Continuation of application No. PCT/CN2020/113824, filed on Sep. 7, 2020.

(30) Foreign Application Priority Data

Nov. 27, 2019 (CN) .......................... 201911184459.0

(51) Int. Cl.
*G06T 7/292* (2017.01)
*G06T 7/215* (2017.01)
*G06T 7/254* (2017.01)

(52) U.S. Cl.
CPC .............. *G06T 7/292* (2017.01); *G06T 7/215* (2017.01); *G06T 7/254* (2017.01)

(58) Field of Classification Search
CPC ......... G06T 7/215; G06T 7/254; G06T 7/292; H04N 23/45; H04N 23/57; H04N 23/60;
(Continued)

(56) References Cited

U.S. PATENT DOCUMENTS 8,547,437 B2 * 10/2013 Buehler ........... G08B 13/19608
348/172
10,893,204 B2 * 1/2021 Yang .................... H04N 23/635
(Continued)

FOREIGN PATENT DOCUMENTS

CN 104717413 A 6/2015
CN 105898143 A 8/2016
(Continued)

OTHER PUBLICATIONS

Ahmedali et al. "Collaborative multi-camera surveillance with automated person detection." The 3rd Canadian Conference on Computer and Robot Vision (CRV'06). IEEE, 2006. (Year: 2006).*
(Continued)

*Primary Examiner* — Katrina R Fujita
(74) *Attorney, Agent, or Firm* — IPX PLLC

(57) ABSTRACT

A photographing method and an electronic device are provided. The photographing method includes: receiving a first input that is performed on a target position in a first preview picture collected by a first camera, and determining a movement speed of a target object according to a plurality of second preview pictures collected by a second camera. The photographing method further includes determining, according to the movement speed, a target time at which the target object moves into a target region. The target region is a region corresponding to the target position. The photographing method also includes controlling the first camera to perform photographing at the target time. A position of the target object in each of the second preview pictures is different, and there is an overlapping picture between the first preview picture and each of the second preview pictures.

20 Claims, 5 Drawing Sheets

(58) Field of Classification Search
CPC .... H04N 23/62; H04N 23/631; H04N 23/632; H04N 23/635; H04N 23/67; H04N 23/73; H04N 23/90
See application file for complete search history.

(56) References Cited

U.S. PATENT DOCUMENTS

| | | | |
|---|---|---|---|
| 11,375,120 B2* | 6/2022 | Wang | H04N 23/64 |
| 2012/0314123 A1 | 12/2012 | Lee et al. | |
| 2017/0019589 A1 | 1/2017 | Moon et al. | |
| 2017/0094189 A1 | 3/2017 | Ogawa | |
| 2017/0251215 A1 | 8/2017 | Abe et al. | |
| 2017/0364755 A1* | 12/2017 | Wu | G06T 7/292 |
| 2018/0189600 A1* | 7/2018 | Astrom | G06T 7/292 |
| 2018/0308243 A1* | 10/2018 | Justice | H04N 23/90 |
| 2019/0043207 A1* | 2/2019 | Carranza | G06V 20/52 |
| 2020/0154032 A1* | 5/2020 | Yu | H04N 23/745 |
| 2021/0136292 A1* | 5/2021 | Hoch | H04N 23/611 |

FOREIGN PATENT DOCUMENTS

| | | |
|---|---|---|
| CN | 105959574 A | 9/2016 |
| CN | 106161924 A | 11/2016 |
| CN | 106357973 A | 1/2017 |
| CN | 106375706 A | 2/2017 |
| CN | 106506942 A | 3/2017 |
| CN | 108322663 A | 7/2018 |
| CN | 108449546 A | 8/2018 |
| CN | 108989665 A | 12/2018 |
| CN | 109344715 A | 2/2019 |
| CN | 110505408 A | 11/2019 |
| CN | 110868550 A | 3/2020 |
| CN | 110933303 A | 3/2020 |
| JP | H0537888 A | 2/1993 |
| JP | H09142210 A | 6/1997 |
| JP | 2017069618 A | 4/2017 |
| KR | 20170008608 A | 1/2017 |
| KR | 20170011321 A | 2/2017 |
| WO | 2009136507 A1 | 11/2009 |
| WO | 2015176322 A1 | 11/2015 |

OTHER PUBLICATIONS

Cai et al. "Multiple human tracking based on distributed collaborative cameras." Multimedia Tools and Applications 76 (2017): 1941-1957. (Year: 2017).*
He et al. "Efficient multi-view multi-target tracking using a distributed camera network." IEEE Sensors Journal 20.4 (2019): 2056-2063. (Year: 2019).*
Xiao et al. "Collaborative tracking for multiple objects in the presence of inter-occlusions." IEEE Transactions on Circuits and Systems for Video Technology 26.2 (2015): 304-318. (Year: 2015).*
International Search Report issued in corresponding International Application No. PCT/CN2020/113824, mailed Oct. 22, 2020, 6 pages.
First Office Action issued in related Chinese Application No. 201911184459.0, mailed Oct. 26, 2020, 6 pages.
Notice of reason of refusal issued in related Japanese Application No. 2022-529026, mailed Jul. 4, 2023, 10 pages.
Office Action issued in related European Application No. 20892251.8, mailed Apr. 15, 2024, 8 pages.
Office Action issued in related Korean Application No. 10-2022-7021512, mailed Jan. 16, 2024, 5 pages.
Extended European Search Report issued in related European Application No. 20892251.8, mailed Dec. 6, 2022, 10 pages.

* cited by examiner

PHOTOGRAPHING METHOD AND ELECTRONIC DEVICE

CROSS-REFERENCE TO RELATED APPLICATIONS

This application is a continuation of International Application No. PCT/CN2020/113824, filed Sep. 7, 2020, which claims priority to Chinese Patent Application No. 201911184459.0, filed in China on Nov. 27, 2019. The entire contents of each of the above-referenced applications are expressly incorporated herein by reference.

TECHNICAL FIELD

Embodiments of this application relate to the field of communication technologies, and in particular, to a photographing method and an electronic device.

BACKGROUND

With the development of terminal technologies and photographing technologies, people have growing opportunities to perform photographing by using electronic devices. In different scenarios, when facing different to-be-photographed objects, a user usually adjusts, according to actual needs, positions of the to-be-photographed objects in preview pictures, and therefore there is a specific requirement for composition during photographing.

Currently, when facing a to-be-photographed object in a movement scenario, a user may capture a transient picture of the moving object in two manners. Specifically, one manner is that, the user may select snap photography, but at the moment when the user presses the shutter, the moving object may not be in the composition position that is ideal for the user; and the other manner is that, the user may perform photographing by using the automatic continuous capture function, but because a time interval exists between two photographs continuously captured, it cannot be ensured that the composition of the captured photographs is satisfactory. Therefore, the probability that the composition of the photograph captured in the conventional photographing manner is satisfactory is relatively low.

SUMMARY

Embodiments of this application provide a photographing method and an electronic device.

The embodiments of this application are implemented as follows:

According to a first aspect, an embodiment of this application provides a photographing method. The method is applicable to an electronic device including at least a first camera and a second camera. The method includes: receiving a first input that is performed on a target position in a first preview picture collected by the first camera, and determining a movement speed of a target object according to a plurality of second preview pictures collected by the second camera; determining, according to the movement speed, a target time at which the target object moves into a target region, where the target region is a region corresponding to the target position; and controlling the first camera to perform photographing at the target time. A position of the target object in each of the second preview pictures is different, and there is an overlapping picture between the first preview picture and each of the second preview pictures.

According to a second aspect, an embodiment of this application provides an electronic device. The electronic device includes at least a first camera and a second camera. The electronic device includes a receiving module, a determining module, and a control module. The receiving module is configured to receive a first input that is performed on a target position in a first preview picture collected by the first camera. The determining module is configured to determine a movement speed of a target object according to a plurality of second preview pictures collected by the second camera. The determining module is further configured to determine, according to the movement speed, a target time at which the target object moves into a target region, where the target region is a region corresponding to the target position. The control module is configured to control the first camera to perform photographing at the target time determined by the determining module. A position of the target object in each of the second preview pictures is different, and there is an overlapping picture between the first preview picture and each of the second preview pictures.

According to a third aspect, an embodiment of this application provides an electronic device, including a processor, a memory, and a computer program stored in the memory and runnable on the processor, where the computer program, when being executed by the processor, implements steps of the photographing method according to the first aspect.

According to a fourth aspect, an embodiment of this application provides a computer-readable storage medium, storing a computer program, where the computer program, when executed by a processor, implements steps of the photographing method according to the first aspect.

In the embodiments of this application, a first input that is performed on a target position in a first preview picture collected by the first camera is received, and a movement speed of a target object is determined according to a plurality of second preview pictures collected by the second camera; a target time at which the target object moves into a target region is determined according to the movement speed, where the target region is a region corresponding to the target position; and the first camera is controlled to perform photographing at the target time. A position of the target object in each of the second preview pictures is different, and there is an overlapping picture between the first preview picture and each of the second preview pictures. Through the solution, the electronic device is provided with two cameras, and the two cameras may respectively collect two different preview pictures for a same to-be-photographed object. Therefore, when facing a to-be-photographed object in a movement scenario, a user may preset, according to actual needs, a composition position of the to-be-photographed object in a first preview picture collected by a first camera, so that the electronic device may determine a photographing time through a movement speed of a target object in a plurality of second preview pictures collected by a second camera, and then the electronic device may obtain a photograph of the to-be-photographed object in the composition position at the photographing time. Therefore, the probability that the composition of the photograph captured by using the photographing method provided in the embodiments of this application is satisfactory is relatively high.

DETAILED DESCRIPTION

Figures 1, 2:
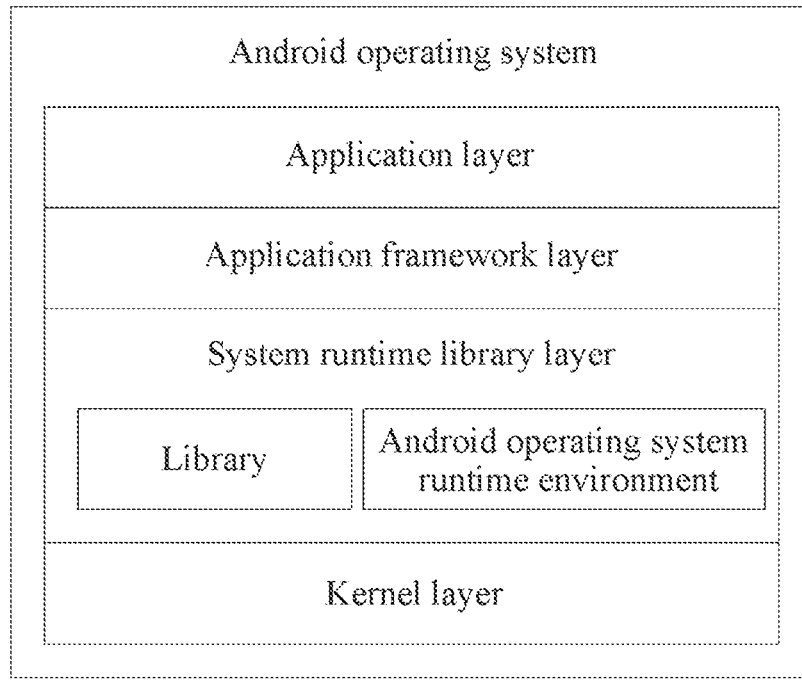
FIG. 1 is a schematic diagram of an architecture of an Android operating system according to an embodiment of this application.
FIG. 2 is a first flowchart of a photographing method according to an embodiment of this application.

The following clearly describes the technical solutions in the embodiments of this application with reference to the accompanying drawings in the embodiments of this application. Apparently, the described embodiments are some rather than all of the embodiments of this application. All other embodiments obtained by a person of ordinary skill in the art based on the embodiments of this application without making creative efforts shall fall within the protection scope of this application.

The term "and/or" used herein describes an association relationship for describing associated objects and represents that three relationships may exist. For example, A and/or B may represent the following three cases: Only A exists, both A and B exist, and only B exists. The character "/" used herein indicates an "or" relationship between associated objects. For example, A/B represents A or B.

In the specification and claims of this application, the terms "first", "second", and the like are intended to distinguish between different objects but do not indicate a particular order of the objects. For example, a first preview picture and a second preview picture are intended to distinguish between different preview pictures but do not indicate a particular order of preview pictures.

In the embodiments of this application, the terms such as "exemplary" and "example" are used to represent giving an example, an illustration or a description. Any embodiment or design scheme described as an "exemplarily" or "for example" in the embodiments of this application should not be explained as having more advantages than another embodiment or design scheme. Exactly, use of the word "exemplarily" or "for example" or the like is intended to present a related concept in a specific manner.

In the description of the embodiments of this application, unless otherwise stated, "a plurality of" means two or more. For example, a plurality of elements mean two or more elements.

Some terms involved in the embodiments of this application are explained and described below.

Focusing: it is also referred to as beam-focusing or light-focusing, and specifically refers to a process in which a distance between a photographed object and an electronic device is adjusted through a focusing mechanism of an electronic device, to change an object distance and an image distance, so that the photographed object is imaged clearly. It should be noted that, a focusing interval of the electronic device in this embodiment may be a first region.

Photometry: it refers to a technology of measuring luminance of light reflected back from the photographed object.

Usually, reflectivity of a photometry region of the electronic device is 18%, and the electronic device performs photometry on the photometry region according to the reflectivity, thereby performing exposure compensation photographing. It is assumed that when an image of a person is taken, a focusing region may be a region in which the person is located. However, when different photometry regions are selected, exquisite delicate images of the person may be taken, or strongly contrasting person profiles may be taken. It should be noted that, a photometry region of the electronic device in this embodiment may be a first region.

Exposure: it refers to the amount of light illuminating a photosensitive element controlled by components such as an aperture, a shutter, and photo-sensibility in a photographing process.

Exposure time: it refers to a time interval from opening to closing of the shutter. Usually, a shorter exposure time indicates a clearer captured image of a moving object.

The embodiments of this application provide a photographing method and an electronic device. A first input that is performed on a target position in a first preview picture collected by the first camera is received, and a movement speed of a target object is determined according to a plurality of second preview pictures collected by the second camera; a target time at which the target object moves into a target region is determined according to the movement speed, where the target region is a region corresponding to the target position; and the first camera is controlled to perform photographing at the target time. A position of the target object in each of the second preview pictures is different, and there is an overlapping picture between the first preview picture and each of the second preview pictures. Through the solution, the electronic device is provided with two cameras, and the two cameras may respectively collect two different preview pictures for a same to-be-photographed object. Therefore, when facing a to-be-photographed object in a movement scenario, a user may preset, according to actual needs, a composition position of the to-be-photographed object in a first preview picture collected by a first camera, so that the electronic device may determine a photographing time through a movement speed of a target object in a plurality of second preview pictures collected by a second camera, and then the electronic device may obtain a photograph of the to-be-photographed object in the composition position at the photographing time. Therefore, the probability that the composition of the photograph captured by using the photographing method provided in the embodiments of this application is satisfactory is relatively high.

The electronic device in the embodiments of this application may be an electronic device having an operating system. The operating system may be an Android operating system, may be an ios operating system, or may be another possible operating system, and is not specifically limited in the embodiments of this application.

A software environment to which the photographing method provided in the embodiments of this application is applied is introduced below by using an Android operating system as an example.

FIG. 1 is a schematic diagram of an architecture of an Android operating system according to an embodiment of this application. In FIG. 1, the architecture Android operating system includes 4 layers, which are respectively: an application layer, an application framework layer, a system runtime library layer, and a kernel layer (which may be specifically a Linu8 kernel layer).

The application layer includes applications in the Android operating system (which include a system application and a third-party application).

The application framework layer is a framework of applications, and a developer may develop, in compliance with development principles of the framework of applications, some applications based on the application framework layer.

The system runtime library layer includes libraries (which are also referred to as system libraries) and an Android operating system runtime environment. The libraries mainly provide various resources required for the Android operating system. The Android operating system runtime environment is used for providing a software environment for the Android operating system.

The kernel layer is an operating system layer of the Android operating system, and is the bottom layer of software layers of the Android operating system. The kernel layer provides, based on a Linu8 kernel, core system services and hardware-related drivers for the Android operating system.

Using the Android operating system as an example, in the embodiments of this application, the developer may develop, based on the system architecture of the Android operating system shown in FIG. 1, a software program for implementing the photographing method provided in the embodiments of this application, thereby enabling the photographing method to be run based on the Android operating system shown in FIG. 1. That is, a processor or an electronic device may implement the photographing method provided in the embodiments of this application by running the software program in the Android operating system.

The electronic device in the embodiments of this application may be a terminal device. The terminal device may be a mobile terminal device or may be a non-mobile terminal device. For example, the mobile terminal device may be a mobile phone, a tablet computer, a notebook computer, a palmtop computer, an in-vehicle electronic device, a wearable device, an Ultra-Mobile Personal Computer (UPC), a netbook, or a Personal Digital Assistant (PDA), and the non-mobile terminal device may be a Personal Computer (PC), a television (TV), a teller machine, or a self-service machine, which is not specifically limited in the embodiments of this application.

An executor of the photographing method provided in the embodiments of this application may be the foregoing electronic device or may be a functional module and/or functional entity capable of implementing the photographing method in the electronic device, may be specifically determined according to actual use requirements, and is not limited in the embodiments of this application. The photographing method provided in the embodiments of this application is exemplarily described below by using an electronic device as an example.

In the embodiments of this application, for a target object in a movement state, if a user estimates that the target object may enter an angle of view of a first camera of the electronic device, and can collect, through the first camera, an image of movement of the target object to a composition position designated by the user, the user may trigger the electronic device through the following photographing method to photograph the target object, to obtain a satisfactory photograph of the target object in the composition position for the user.

As shown in FIG. 2, an embodiment of this application provides a photographing method. The method is applicable to an electronic device including at least a first camera and a second camera. The method may include the following S101 to S103.

S101. The electronic device receives a first input that is performed on a target position in a first preview picture collected by the first camera, and determines a movement speed of a target object according to a plurality of second preview pictures collected by the second camera.

A position of the target object in each of the second preview pictures is different. There is an overlapping picture between the first preview picture and each of the second preview pictures.

In some embodiments, in this embodiment of this application, an optical axis of the first camera of the electronic device is parallel to an optical axis of the second camera, and an angle of view of the second camera is greater than an angle of view of the first camera. Through this setting manner, there may be an overlapping picture between the first preview picture and each of the second preview pictures.

In some embodiments, the first camera and the second camera may be located on a same plane of the electronic device. For example, the first camera and the second camera may be located on a plane on which a screen of the electronic device is located, which may be referred to as a front face; or located on a plane opposite to the plane on which the screen of the electronic device is located, which may be referred to as a back face.

For example, description is made by using an example in which the first camera and the second camera are located on the back face of the electronic device. A main camera and an ultra-wide angle camera may be arranged on the back face of the electronic device. The main camera is the first camera, and the ultra-wide angle camera is the second camera.

In some embodiments, the first preview picture may be a preview picture collected by the first camera at a first moment, or may be a preview picture collected by the first camera at any moment after the first moment. The first moment may be a moment at which the electronic device triggers the first camera to begin collecting the first preview picture.

In this embodiment of this application, the foregoing target position may be considered as a composition position designated by a user.

In some embodiments, in this embodiment of this application, the first input may be a touch input, a gesture input, or the like. For example, the touch input may be a click input performed by the user in the target position in the first preview picture, and the gesture input may be a slide input performed by the user in the first preview picture.

In some embodiments, before S101, the photographing method provided in this embodiment of this application may further include: in response to an input performed by the user, running a camera application, and triggering the first camera and the second camera to respectively collect photographing pictures; and displaying the photographing picture collected through the first camera, for example, a first photographing picture.

In some embodiments, after the running a camera application, and before the triggering the first camera and the second camera to respectively collect photographing pictures, the photographing method provided in this embodiment of this application may further include: enabling a moving object composition mode in response to an input performed by the user. The moving object composition mode is used by the user to designate a composition region.

In some embodiments, because the electronic device simultaneously collects the photographing pictures through the first camera and the second camera respectively, a possible implementation is that the electronic device simultaneously displays the first preview picture collected through the first camera and the second preview picture collected through the second camera; and another possible implementation is that the electronic device displays the first preview picture collected through the first camera but does not display the second preview picture collected through the second camera.

In some embodiments, when the first input performed by the user is received, a relationship among the target object, the first preview picture, and the second preview picture may be any one of the following:

First relationship: the target object is in the second preview picture, but is not in the first preview picture.

Second relationship: the target object is in both the first preview picture and the second preview picture.

Third relationship: the target object is in neither the first preview picture nor the second preview picture.

In some embodiments, the target object may be any movable living body and non-living body. For example, the target object may be a person, an automobile, a basketball, a football, or an airplane.

In some embodiments, the target object may be in any movement mode. For example, the movement mode may be a jump mode or a horizontal movement mode. The jump mode may include: jump shot and diving. The horizontal movement mode may include: walking, running, bicycle riding, and car racing.

In some embodiments, the target object may be an object in uniform motion or an object in non-uniform motion.

In some embodiments, the movement speed may be an average speed of the target object.

In some embodiments, a movement route of the target object may be a straight line or a curve.

In some embodiments, the movement speed of the target object is determined through at least two second preview pictures. The two second preview pictures may be collected by the second camera at two neighboring moments, or may be collected at non-neighboring moments.

In some embodiments, before the determining, according to second preview pictures collected by the second camera, a movement speed of a target object in the second preview pictures, the photographing method provided in this embodiment of this application may further include: detecting whether a moving object such as the target object exists in the second preview pictures. It may be understood that, when the target object is detected in the second preview pictures, the electronic device may determine, according to the second preview pictures, the movement speed of the target object in the second preview pictures.

In some embodiments, because the target object is a moving object, a position of the target object in each of the second preview pictures collected through the second camera is different.

In some embodiments, that there is an overlapping picture between the first preview picture and each of the second preview pictures means that in the process of collecting the first preview picture through the first camera and collecting the second preview pictures through the second camera respectively, the target object occurs each of the first preview picture and the second preview pictures.

In some embodiments, the "determining a movement speed of a target object according to a plurality of second preview pictures collected by the second camera" in S101 may be specifically implemented through the following A1 to A3.

A1. The electronic device determines a first position.

The first position may be a position of the target object in a second preview picture, and the second preview picture may be a preview picture collected through the second camera at a first moment.

In some embodiments, the first moment may be a moment at which the second camera detects a moving object, or the first moment may be any moment after the second camera detects a moving object.

A2. The electronic device determines a second position.

The second position may be a position of the target object in another second preview picture. The another second preview picture may be a preview picture collected through the second camera at a second moment. The second moment is a moment after the first moment.

In some embodiments, the first moment and the second moment may be two neighboring moments, that is, the second moment may be a next moment of the first moment. Alternatively, the first moment and the second moment may be two non-neighboring moments, that is, the second moment may be a moment after a period of time following the first moment.

A3. The electronic device determines the movement speed according to the first position, the second position, the first moment, and the second moment.

In some embodiments, a connecting line between the first position and the second position may be parallel to a horizontal line, or perpendicular to the horizontal line, or neither parallel to the horizontal line nor perpendicular to the horizontal line.

Figures 4, 5:
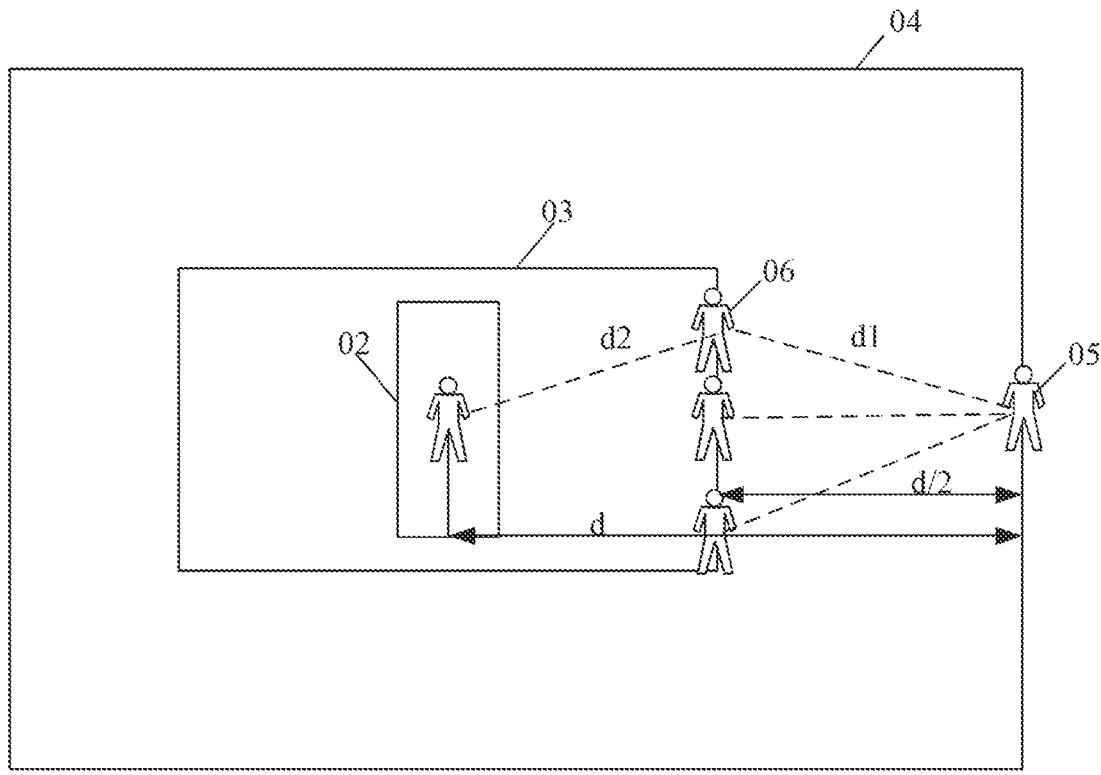
FIG. 4 is a schematic diagram of movement of a target object according to an embodiment of this application.
FIG. 5 is a second flowchart of a photographing method according to an embodiment of this application.

For example, description is made by using an example in which the first position is a position of the target object in a preview picture collected by the second camera at the moment at which the second camera detects the moving object. As shown in FIG. 4, a target region designated by a user may be represented by using 02, the first preview picture collected through the first camera may be represented by using 03, the second preview pictures collected through the second camera may be represented by using 04, the first position of the target object in a second preview picture 04 at the first moment t1 may be represented by using 05, and a position of the target object in another second preview picture 04 at the second moment t2 may be represented by using 06. At the first moment t1, the electronic device may detect that the target object is in a position 05, and detect that a straight line distance between the position 05 and a third position corresponding to the region 02 designated by the user is d. At the second moment t2, the target object may move to any second position on an extension line of d/2. If a movement distance by which the target object moves from the first position to the second position in the second preview picture is represented by using d1, the movement speed of the target object may be $v=d1/(t2-t1)$.

It should be noted that, the movement distance d1 of the movement from the first position to the second position may be minimally d/2, or may be greater than d/2, which may be specifically determined according to actual use requirements.

It may be understood that, because positions of the target object in two preview pictures collected through the second camera at different moments may be determined, the electronic device may determine the movement speed of the target object according to the two positions, and therefore may determine a target time at which the target object moves to the target region.

S102. The electronic device determines, according to the movement speed, a target time at which the target object moves into a target region.

The target region may be a region corresponding to the target position.

In some embodiments, S102 may be specifically implemented through the following B1 to B3.

B1. The electronic device determines a third position.

The third position may be a position in the another second preview picture corresponding to the target region. The another second preview picture may be a preview picture collected through the second camera at a second moment. The second moment is a moment after the first moment.

B2. The electronic device determines, according to the third position, the second position, and the movement speed, a movement duration during which the target object moves from the second position to the third position.

In some embodiments, a connecting line between the third position and the second position may be parallel to the horizontal line, or perpendicular to the horizontal line, or neither parallel to the horizontal line nor perpendicular to the horizontal line.

For example, as shown in FIG. 4, description is made by using an example in which the second position is still any position on the extension line of d/2 to which the target object moves. Assuming that the distance by which the target object moves from the second position to the third position corresponding to the region 01 designated by the user in the second preview picture is represented by using d2 and the movement speed of the target object is represented by using v, the movement duration during which the target object moves from the second position to the third position may be t3=d2/v.

B3. The electronic device determines the target time according to the movement duration and the second moment.

For example, as shown in FIG. 4, description is made by using an example in which the second position is still any position on the extension line of d/2 to which the target object moves. Assuming that the movement duration during which the target object moves from the second position to the third position is represented by using d2/v and the second moment is represented by using t2, the target time may be t=t2+(d2/v).

In some embodiments, before S102, the photographing method provided in this embodiment of this application may further include the following C1 to C3.

C1. The electronic device determines an initial region according to the target position.

In some embodiments, the target position may be a position of the first input in the first preview picture.

In some embodiments, the first input may be specifically a slide input or click input in the first preview picture.

For example, the target position may be a position of a slide input in the first preview picture or a position of a click input in the first preview picture.

In some embodiments, in a case that the first input is specifically a slide input in the first preview picture, C1 may be specifically implemented through the following manner 1. In a case that the first input is specifically a click input in the first preview picture, C1 may be specifically implemented through the following manner 2.

Manner 1. The electronic device determines, according to a slide trajectory of the first input in the first preview picture, a region surrounded by the slide trajectory as the initial region in a case that the first input is a slide input in the target position.

In some embodiments, the slide trajectory of the first input in the first preview picture may be closed or non-closed.

It should be noted that, in a case that the slide trajectory is a closed trajectory, a region surrounded by the closed trajectory is the initial region. In a case that the slide trajectory is a non-closed trajectory, the electronic device may adjust the non-closed trajectory to a closed trajectory, and a region surrounded by the closed trajectory is used as the initial region.

Moreover, a direction, a size, a shape, a position, and the like of the slide trajectory are all decided by the user.

Figure 3A:
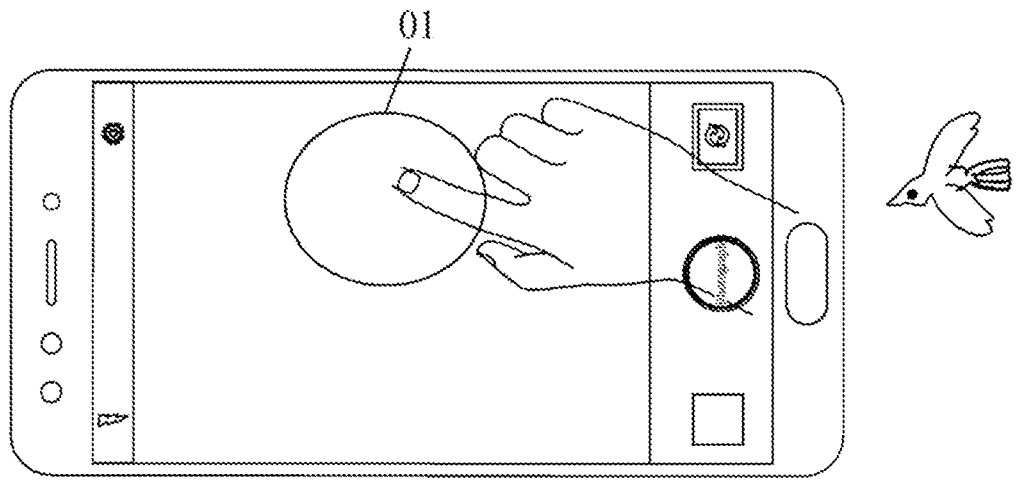
FIGS. 3a and 3b are schematic diagrams of an operation of a user on a preview picture according to an embodiment of this application.

For example, as shown in FIG. 3*a*, the user may slide a finger in the first preview picture, and therefore the electronic device may determine a region 01 surrounded by the slide trajectory as the initial region.

Manner 2. The electronic device determines a region with a preset size centered on the target position as the initial region in a case that the first input is a click input in the target position.

In some embodiments, the region with the preset size centered on the target position may be in any shape, for example, a circle, an ellipse, a square, or another possible shape.

For example, as shown in FIG. 3*a*, the user may perform a click operation in the first preview picture, and the electronic device may determine a circular region 01 by using the click position as the center and using the preset length as the radius, and the circular region 01 is used as the initial region.

C2. The electronic device determines a size of the target object in the first preview picture according to sizes of the target object in the second preview pictures, a photographing parameter of the first camera, and a photographing parameter of the second camera.

In some embodiments, before B2, the photographing method provided in this embodiment of this application further includes: determining a size of the target object in the second preview picture through the second camera.

In some embodiments, the photographing parameter may include at least one of the following: an angle of view, a focal length, a magnification, and the like.

It may be understood that, that the electronic device determines a size of the target object in the first preview picture according to sizes of the target object in the second preview pictures, a photographing parameter of the first camera, and a photographing parameter of the second camera means that the electronic device converts the size of the target object in the second preview picture into the size of the target object in the first preview picture according to a conversion relationship between the photographing parameter of the first camera and the photographing parameter of the second camera.

It should be noted that, an order of performing C1 and C2 is not limited in this embodiment of this application. That is, the electronic device may first perform C1 and then perform C2, or may first perform C2 and then perform C1, or may simultaneously perform C1 and C2.

C3. The electronic device adjusts the initial region according to the size of the target object in the first preview picture, to obtain the target region.

It should be noted that, the sizes of the initial region and the target region may be the same or different. If the sizes of the initial region and the target region are the same, C3 may not need to be performed.

In some embodiments, the target region may be obtained by expanding radially by using the initial region as the center, that is, the size of the target region is greater than the size of the initial region. Alternatively, the target region may be obtained by contracting the initial region, that is, the size of the target region is less than the size of the initial region.

It may be understood that, because angles of view of the first camera and the second camera are different, sizes of the target object in the first preview picture collected through the first camera and the second preview picture collected through the second camera are different. Through size conversion, the region may be adjusted in size, thereby enabling the target object to be more precisely located in an adjusted region, that is, enabling composition to be more precise.

S103. The electronic device controls the first camera to perform photographing at the target time.

Figure 3B:
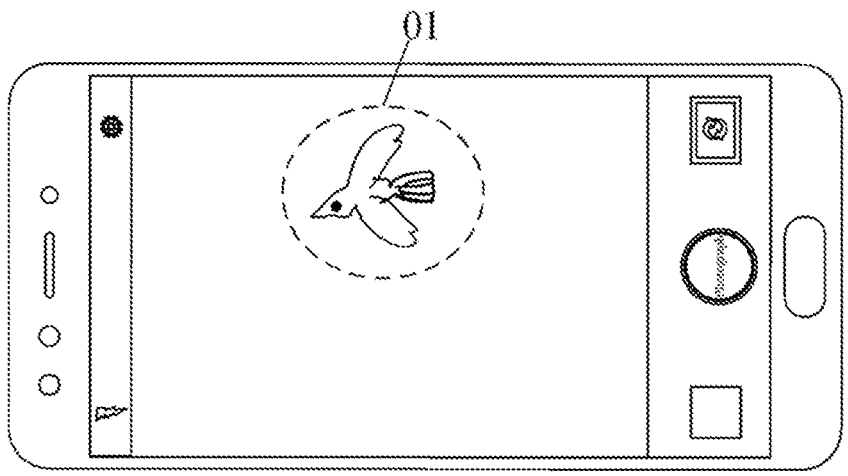

For example, it is assumed that the first camera is a main camera, the second camera is an ultra-wide angle camera, and the target object is a flying little bird. As shown in FIG. 3a, the user may trigger the electronic device to run a camera application to perform photographing, and trigger the main camera and the ultra-wide angle camera to respectively collect preview pictures, and the first preview picture collected through the main camera is displayed. The user may perform a click input in the first preview picture collected through the main camera, to determine an initial region 01. If the target object is detected in the second preview picture collected through the ultra-wide angle camera, the electronic device may determine the size of the target object in the first preview picture according to the size of the target object in the second preview picture, the photographing parameter of the first camera, and the photographing parameter of the second camera, obtain a target region 01 according to the size in the first preview picture, and determine a movement speed of the target object according to positions of the target object in two preview pictures collected through the ultra-wide angle camera at two different moments. In this way, the electronic device may determine a target time according to the target region 01 and the movement speed, and cause the main camera to perform automatic photographing at the target time, to obtain a photograph of the target object having moved to a composition region shown in FIG. 3b.

This embodiment of this application provides a photographing method. The electronic device is provided with two cameras, and the two cameras may respectively collect two different preview pictures for a same to-be-photographed object. Therefore, when facing a to-be-photographed object in a movement scenario, a user may preset, according to actual needs, a composition position of the to-be-photographed object in a first preview picture collected by a first camera, so that the electronic device may determine a photographing time through a movement speed of a target object in a plurality of second preview pictures collected by a second camera, and then the electronic device may obtain a photograph of the to-be-photographed object in the composition position at the photographing time. Therefore, the probability that the composition of the photograph captured by using the photographing method provided in the embodiments of this application is satisfactory is relatively high.

In some embodiments, with reference to FIG. 2, as shown in FIG. 5, after S102 and before S103, the photographing method provided in this embodiment of this application may further include the following S104 and S105. Moreover, S103 may be specifically implemented through the following S103A.

S104. The electronic device controls the first camera to focus on the target region.

In some embodiments, before the first input performed by the user is received, the focusing region of the first camera may be the target region or not be the target region. If the focusing region is the target region, the electronic device may not need to perform focusing again. If the focusing region is not the target region, the electronic device may make the first camera focus on the target region.

In some embodiments, the target region may be a region on which the electronic device makes the first camera focus by default.

S105. The electronic device performs photometry on the target region, to determine an exposure compensation value.

In some embodiments, the exposure compensation value may be a positive number or negative number. If the exposure compensation value is a positive number, the electronic device may increase the exposure. If the exposure compensation value is a negative number, the electronic device may reduce the exposure.

It should be noted that, an order of performing S104 and S105 is not specifically limited in this embodiment of this application. That is, the electronic device may first perform S104 and then perform S105; or may first perform S105 and then perform S104; or may simultaneously perform s104 and S105.

S103A. The electronic device controls, at the target time, the first camera to perform exposure compensation according to the exposure compensation value and obtain a photograph.

For example, it is assumed that the first camera is a main camera, the second camera is an ultra-wide angle camera, and the target object is a flying little bird. As shown in FIG. 3a, the electronic device makes the main camera focus to a target region 01, and performs photometry on the target region 01 to determine an exposure compensation value. At the target time, the electronic device may perform exposure compensation for an exposure value of the first camera according to the exposure compensation value, thereby obtaining a photograph of the target object shown in FIG. 3b that is bright and clear and whose composition is satisfactory.

Through the photographing method provided in this embodiment of this application, the first camera focuses on the target region and photometry is performed on the target region, to determine an exposure compensation value. Therefore, at the target time, the electronic device may perform exposure compensation for an exposure value of the first camera according to the exposure compensation value, thereby obtaining a photograph that is bright and clear and whose composition is satisfactory.

Figure 6:
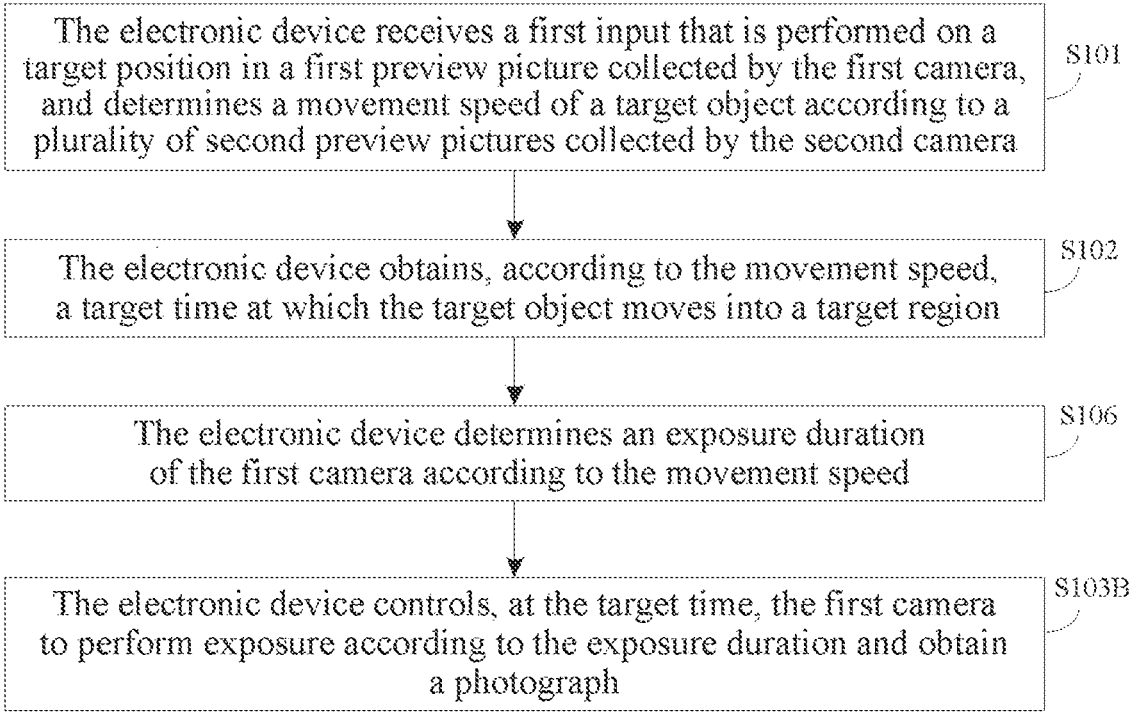
FIG. 6 is a third flowchart of a photographing method according to an embodiment of this application.

In some embodiments, the electronic device stores a plurality of speed intervals and a plurality of exposure durations, and one speed interval corresponds to one exposure duration. With reference to FIG. 2, as shown in FIG. 6, after S102 and before S103, the photographing method provided in this embodiment of this application may further include the following S106. Moreover, S103 may be specifically implemented through the following S103B.

S106. The electronic device determines an exposure duration of the first camera according to the movement speed.

It should be noted that, in this embodiment of this application, the methods shown in FIG. 5 and FIG. 6 may be performed, or the method shown in only FIG. 5 or only FIG. 6 may be performed. In a case that the methods shown in both FIG. 5 and FIG. 6 may be performed, an order of performing S104 and S106 is not limited in this embodiment of this application.

In some embodiments, the exposure duration may be set at delivery of the electronic device or set by the user autonomously.

In some embodiments, S106 may be specifically implemented through the following D1 and D2.

D1. The electronic device determines a target speed interval according to the movement speed, where the target speed interval is an interval to which the movement speed belongs of the plurality of speed intervals.

D2. The electronic device determines an exposure duration corresponding to the target speed interval as the exposure duration of the first camera.

It should be noted that, the exposure duration may be also referred to as an exposure time.

In some embodiments, one exposure duration may correspond to one speed interval, or one exposure duration may correspond to a plurality of speed intervals. This is not limited in this embodiment of this application and may be specifically determined according to actual needs.

In some embodiments, if a current exposure time of the first camera in the electronic device is a minimum exposure time before S106 is performed, the electronic device does not reduce the exposure time according to the movement speed.

In some embodiments, if a current exposure time of the first camera in the electronic device is a maximum exposure time before S106 is performed, the electronic device does not increase the exposure time according to the movement speed.

S103B. The electronic device controls, at the target time, the first camera to perform exposure according to the exposure duration and obtain a photograph.

For example, it is assumed that the electronic device stores a plurality of speed intervals and a plurality of exposure durations. According to movement speeds of the object, the plurality of speed intervals may be [v1, v2), [v2, v3), [v3, v4), and [v4, x) respectively in ascending order, where x is greater than v4. According to exposure times in descending order, the plurality of exposure durations may be shutter_time1, shutter_time2, shutter_time3, and shutter_time4 respectively; and [v1, v2) corresponds to shutter_time1, [v2, v3) corresponds to shutter_time2, [v3, v4) corresponds to shutter_time3, [v4, x) corresponds to shutter_time4, and the current exposure time of the first camera of the electronic device is shutter_time2. If the movement speed of the target object belongs to the speed interval [v3, v4), the exposure time of the first camera of the electronic device is adjusted from shutter_time2 to shutter_time3.

Through the photographing method provided in this embodiment of this application, the electronic device may determine an exposure duration according to the movement speed of the target object, and the electronic device controls the first camera to perform photographing according to the exposure duration. Therefore, poor image quality caused when the movement speed does not match the exposure duration may be avoided. For example, a blurred smear phenomenon caused because the movement speed of the to-be-photographed object is relatively high while the exposure time is excessively long is avoided.

It should be noted that, in the embodiments of this application, each photographing method shown in the foregoing accompanying drawings is exemplarily described with reference to one accompanying drawing in the embodiments of this application. During specific implementation, the photographing methods shown in the foregoing accompanying drawings may be further implemented with reference to any other combinable accompanying drawings schematically described in the foregoing embodiments, and details are not described herein again.

Figure 7:
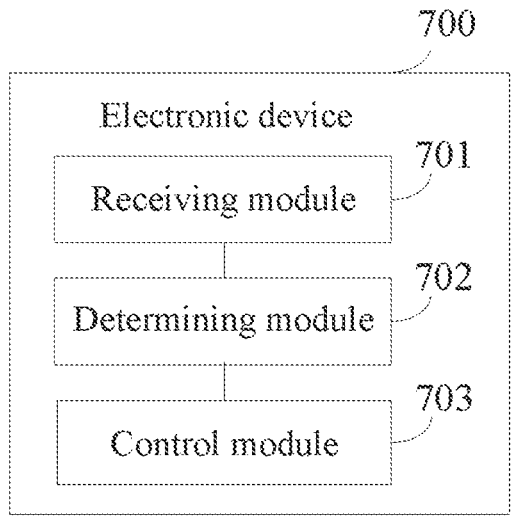
FIG. 7 is a schematic structural diagram of an electronic device according to an embodiment of this application.

As shown in FIG. 7, an embodiment of this application provides an electronic device 700. The electronic device includes at least a first camera and a second camera. The electronic device may include a receiving module 701, a determining module 702, and a control module 703. The receiving module 701 is configured to receive a first input that is performed on a target position in a first preview picture collected by the first camera. The determining module 702 is configured to determine a movement speed of a target object according to a plurality of second preview pictures collected by the second camera; and determine, according to the movement speed, a target time at which the target object moves into a target region, where the target region is a region corresponding to the target position. The control module 703 is configured to control the first camera to perform photographing at the target time determined by the determining module 702. A position of the target object in each of the second preview pictures is different, and there is an overlapping picture between the first preview picture and each of the second preview pictures.

In some embodiments, the determining module 702 is further configured to determine an initial region according to the target position before the target time at which the target object moves into the target region is determined according to the movement speed. The determining module 702 is further configured to determine a size of the target object in the first preview picture according to sizes of the target object in the second preview pictures, a photographing parameter of the first camera, and a photographing parameter of the second camera. The control module 703 is further configured to adjust, according to the size of the target object in the first preview picture, the initial region determined by the determining module 702, to obtain the target region.

In some embodiments, the determining module 702 is further configured to determine, according to a slide trajectory of the first input in the first preview picture, a region surrounded by the slide trajectory as the initial region in a case that the first input is a slide input in the target position; or determine a region with a preset size centered on the target position as the initial region in a case that the first input is a click input in the target position.

In some embodiments, the control module 703 is further configured to control the first camera to focus on the target region before the first camera is controlled to perform photographing at the target time. The determining module 702 is further configured to perform photometry on the target region, to determine an exposure compensation value. The control module 703 is further configured to control, at the target time, the first camera to perform exposure compensation according to the exposure compensation value and obtain a photograph.

In some embodiments, the determining module 702 is further configured to determine an exposure duration of the first camera according to the movement speed before the control module 703 controls the first camera to perform photographing at the target time. The control module 703 is further configured to control, at the target time, the first camera to perform exposure according to the exposure duration determined by the determining module 702 and obtain a photograph.

In some embodiments, in a case that the electronic device stores a plurality of speed intervals and a plurality of exposure durations, and one speed interval corresponds to one exposure duration, the determining module 702 is further configured to determine a target speed interval according to the movement speed, where the target speed interval is an interval to which the movement speed belongs of the plurality of speed intervals; and determine an exposure duration corresponding to the target speed interval as the exposure duration of the first camera. The target speed interval is an interval to which the movement speed belongs of the plurality of speed intervals.

In some embodiments, the determining module 702 is further configured to determine a first position, where the first position is a position of the target object in a second preview picture, and the second preview picture is a preview picture collected through the second camera at a first moment; determine a second position, where the second position is a position of the target object in another second preview picture, the another second preview picture is a preview picture collected through the second camera at a second moment, and the second moment is a moment after the first moment; and determine the movement speed according to the first position, the second position, the first moment, and the second moment.

In some embodiments, the determining module 702 is further configured to determine a third position, where the third position is a position in the another second preview picture corresponding to the target region; determine, according to the third position, the second position, and the movement speed, a movement duration during which the target object moves from the second position to the third position; and determine the target time according to the movement duration and the second moment.

The electronic device provided in this embodiment of this application can implement each process implemented by the electronic device in the foregoing method embodiments. To avoid repetition, details are not described herein again.

This embodiment of this application provides an electronic device. The electronic device is provided with two cameras, and the two cameras may respectively collect two different preview pictures for a same to-be-photographed object. Therefore, when facing a to-be-photographed object in a movement scenario, a user may preset, according to actual needs, a composition position of the to-be-photographed object in a first preview picture collected by a first camera, so that the electronic device may determine a photographing time through a movement speed of a target object in a plurality of second preview pictures collected by a second camera, and then the electronic device may obtain a photograph of the to-be-photographed object in the composition position at the photographing time. Therefore, the probability that the composition of the photograph captured by using the electronic device provided in the embodiments of this application is satisfactory is relatively high.

Figure 8:
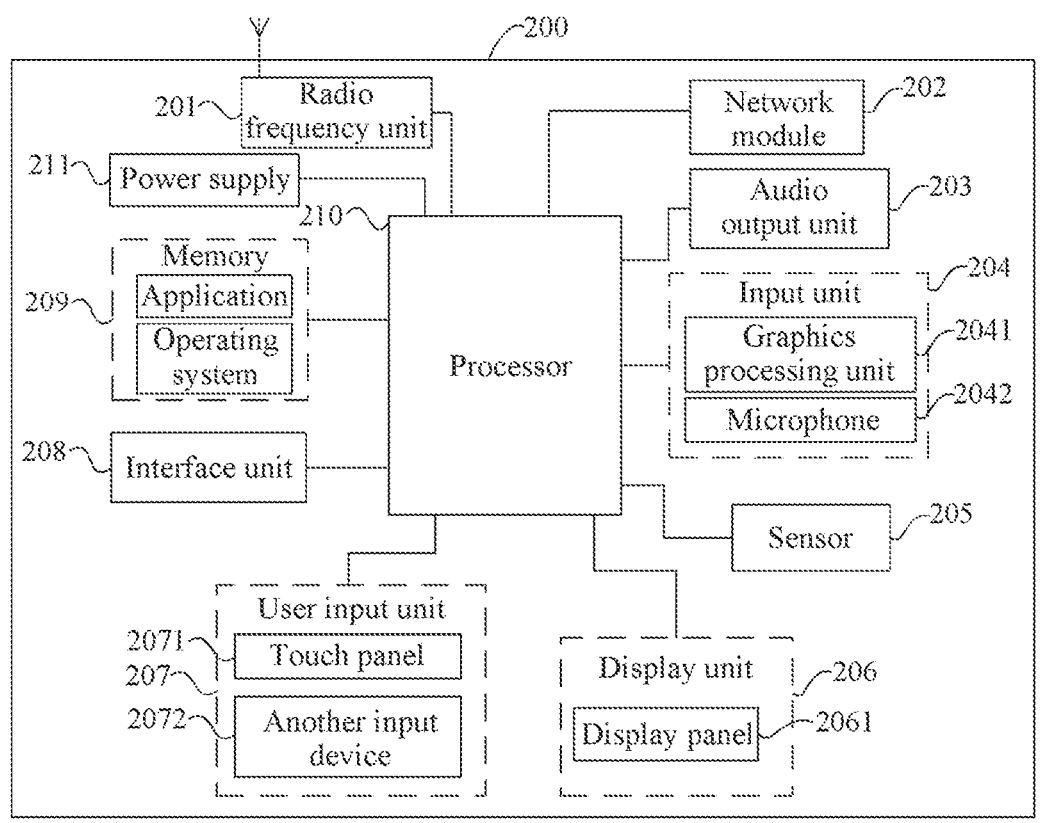
FIG. 8 is a schematic diagram of hardware of an electronic device according to an embodiment of this application.

FIG. 8 is a schematic diagram of a hardware structure of an electronic device provided for implementing each embodiment of this application. The electronic device may be a terminal device such as a mobile phone. As shown in FIG. 8, the electronic device 200 includes, but not limited to: components such as a radio frequency unit 201, a network module 202, an audio output unit 203, an input unit 204, a sensor 205, a display unit 206, a user input unit 207, an interface unit 208, a memory 209, a processor 210, and a power supply 211. A person skilled in the art may understand that the electronic device structure shown in FIG. 8 does not constitute a limitation to the electronic device. The electronic device may include more or fewer components than those shown in the figure, may combine some components, or may have different component arrangements. The electronic device in the embodiments of this application includes, but is not limited to, a mobile phone, a tablet computer, a notebook computer, a palmtop computer, an in-vehicle electronic device, a wearable device, a pedometer, and the like.

The processor 210 is configured to control the user input unit 207 to receive a first input that is performed on a target position in a first preview picture collected by the first camera, and determine a movement speed of a target object according to a plurality of second preview pictures collected by the second camera; determine, according to the movement speed, a target time at which the target object moves into a target region, where the target region is a region corresponding to the target position; and control the first camera to perform photographing at the target time. A position of the target object in each of the second preview pictures is different, and there is an overlapping picture between the first preview picture and each of the second preview pictures.

This embodiment of this application provides an electronic device. The electronic device is provided with two cameras, and the two cameras may respectively collect two different preview pictures for a same to-be-photographed object. Therefore, when facing a to-be-photographed object in a movement scenario, a user may preset, according to actual needs, a composition position of the to-be-photographed object in a first preview picture collected by a first camera, so that the electronic device may determine a photographing time through a movement speed of a target object in a plurality of second preview pictures collected by a second camera, and then the electronic device may obtain a photograph of the to-be-photographed object in the composition position at the photographing time. Therefore, the probability that the composition of the photograph captured by using the electronic device provided in the embodiments of this application is satisfactory is relatively high.

It should be understood that, in this embodiment of this application, the radio frequency unit 201 may be configured to receive and transmit a signal in an information receiving and transmission process or a call process, and specifically, after receiving downlink data from a base station, transmit the downlink data to the processor 210 for processing; and further transmit uplink data to the base station. Generally, the radio frequency unit 201 includes, but is not limited to, an antenna, at least one amplifier, a transceiver, a coupler, a low noise amplifier, a duplexer, and the like. In addition, the radio frequency unit 201 may further communicate with a network device and another device through a wireless communication system.

The electronic device 200 may provide wireless broadband Internet access for the user by using the network module 202, for example, help a user to send and receive an email, browse a web page, and access stream media.

The audio output unit 203 may convert audio data received by the radio frequency unit 201 or the network module 202 or stored in the memory 209 into an audio signal and output the audio signal as a sound. In addition, the audio output unit 203 may further provide audio output (for example, a call signal reception sound or a message reception sound) related to a specific function performed by the electronic device 200. The audio output unit 203 includes a speaker, a buzzer, a receiver, and the like.

The input unit 204 is configured to receive an audio or video signal. The input unit 204 may include a Graphics Processing Unit (GPU) 2041 and a microphone 2042. The GPU 2041 is configured to process image data of a static picture or a video that is captured by an image capturing apparatus (for example, a camera) in a video capture mode or an image capture mode. An image frame that has been processed may be displayed on the display unit 206. An image frame processed by the graphics processing unit 2041 may be stored in the memory 209 (or other storage media) or sent by the radio frequency unit 201 or the network module 202. The microphone 2042 can receive a sound and can process the sound into audio data. The processed audio data can be converted into a format that can be sent to a mobile communication base station through the radio frequency unit 201 in a telephone call mode, for outputting.

The electronic device 200 further includes at least one sensor 205, such as an optical sensor, a motion sensor, and other sensors. Specifically, the optical sensor includes an ambient light sensor and a proximity sensor. The ambient light sensor may adjust luminance of the display panel 2061 according to brightness of the ambient light. The proximity sensor may switch off the display panel 2061 and/or backlight when the electronic device 200 is moved to the ear. As one type of the motion sensor, an accelerometer sensor may detect a magnitude of acceleration in various directions (generally three axes), and may detect a magnitude and a direction of gravity when static, which may be configured to recognize a posture of the electronic device (such as horizontal and vertical screen switching, related games, and magnetometer posture calibration), vibration recognition related functions (such as pedometer and tap), and the like. The sensor 205 may further include a fingerprint sensor, a pressure sensor, an his sensor, a molecular sensor, a gyroscope, a barometer, a hygrometer, a thermometer, an infrared sensor, and the like. Details are not described herein.

The display unit 206 is configured to display information inputted by the user or information provided for the user. The display unit 206 may include a display panel 2061. The display panel 2061 may be configured in the form of a Liquid Crystal Display (LCD), an Organic Light-Emitting Diode (OLED), or the like.

The user input unit 207 is configured to receive inputted digital or character information, and generate a key signal input related to user settings and function control of the electronic device. To be specific, the user input unit 207 may include a touch panel 2071 and another input device 2072. The touch panel 2071, also referred to as a touchscreen, is configured to collect a touch operation made by the user on or in proximity to the touch panel 2071 (for example, an operation made by the user through any appropriate object or attachment (for example, finger or stylus) on or in proximity to the touch panel 2071). The touch panel 2071 may include two parts: a touch detection apparatus and a touch controller. The touch detection apparatus detects a touch orientation of the user, detects a signal brought through the touch operation, and transmits the signal to the touch controller. The touch controller receives touch information from the touch detection apparatus, converts the touch information into a contact coordinate, then transmits the contact coordinate to the processor 210, receives and executes a command transmitted by the processor 210. In addition, the touch panel 2071 may be implemented by using various types, such as a resistive type, a capacitance type, an infrared type, and a surface acoustic wave type. In addition to the touch panel 2071, the user input unit 207 may further include the another input device 2072. Specifically, the another input device 2072 may include, but is not limited to, a physical keyboard, a functional key (for example, a volume control key or a switch key), a track ball, a mouse, and a joystick, and details are not described herein again.

Further, the touch panel 2071 may cover the display panel 2061. When detecting a touch operation made on or in proximity to the touch panel 2071, the touch panel 2071 transmits the touch information to the processor 210 so as to determine a type of a touch event. Then, the processor 210 provides a corresponding visual output on the display panel 2061 in accordance with the type of the touch event. Although the touch panel 2071 and the display panel 2061 are used as two separate parts to implement input and output functions of the electronic device in FIG. 8, in some embodiments, the touch panel 2071 and the display panel 2061 may be integrated to implement the input and output functions of the electronic device, which is not limited herein.

The interface unit 208 is an interface by which an external apparatus and the electronic device 200 are connected. For example, the external apparatus may include a wired or wireless headset port, an external power supply (or battery charger) port, a wired or wireless data port, a storage card port, a port configured to connect an apparatus having an identification module, an audio input/output (I/O) port, a video I/O port, an earphone port, and the like. The interface unit 208 may be configured to receive an input (for example, data information or power) from the external apparatus and transmit the received input to one or more elements within the electronic device 200, or may be configured to transmit data between the electronic device 200 and the external apparatus.

The memory 209 is configured to store a software program and various data. The memory 209 may mainly include a program storage area and a data storage area. The program storage region may store an operating system, an application required by at least one function (for example, a voice playing function or an image playing function), and the like. The data storage area may store data (for example, audio data and a phone book) created according to use of the mobile phone. In addition, the memory 209 may include a high speed random access memory, and may further include a non-volatile memory, such as at least one magnetic disk storage device, a flash memory device or other non-volatile solid state storage devices.

The processor 210 is a control center of the electronic device, and connects various parts of the entire electronic device by using various interfaces and lines. By running or executing a software program and/or a module stored in the memory 209, and invoking data stored in the memory 209, the processor performs various functions of the electronic device and processes data, thereby performing overall monitoring on the electronic device. The processor 210 may include one or more processing units. In some embodiments, the processor 210 may integrate an application processor and a modem. The application processor mainly processes an operating system, a user interface, an application, and the like. The modem mainly processes wireless communication. It may be understood that, the modem processor may not be integrated into the processor 210.

The electronic device 200 may further include the power supply 211 (such as a battery) for supplying power to the components. In some embodiments, the power supply 211 may be logically connected to the processor 210 by using a power management system, thereby implementing functions such as charging, discharging and power consumption management by using the power management system.

In addition, the electronic device 200 includes some functional modules that are not shown. Details are not described herein.

In some embodiments, an embodiment of this application further provides an electronic device, including the processor 210 and the memory 209 that are shown in shown in FIG. 8, and a computer program stored in the memory 209 and runnable on the processor 210. The computer program, when being executed by the processor 210, implements each process of the foregoing method embodiments, and can achieve the same technical effect. To avoid repetition, details are not described herein again.

The embodiments of this application further provide a computer-readable storage medium storing therein a computer program. The computer program is executable by a processor to implement the processes of the embodiments of the foregoing method, and the same technical effects can be achieved, which will not be described in detail herein again to avoid repetition. The computer-readable storage medium is, for example, a Read-Only Memory (ROM), a Random Access Memory (RAM), a magnetic disk, or an optical disc.

It should be noted that, the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially or the part contributing to the related art may be implemented in a form of a software product. The computer software product is stored in a storage medium (such as a ROM/RAM, a magnetic disk, or an optical disc) and includes several instructions for instructing an electronic device (which may be a mobile phone, a computer, a server, an air conditioner, a network device, or the like) to perform the methods described in the embodiments of this application.

Although the embodiments of this application have been described above with reference to the accompanying drawings, this application is not limited to the specific embodiments described above, and the specific embodiments described above are merely exemplary and not limitative. A person of ordinary skill in the art may make various variations under the teaching of this application without departing from the spirit of this application and the protection scope of the claims, and such variations shall all fall within the protection scope of this application.

What is claimed is:

1. A photographing method, applicable to an electronic device comprising at least a first camera and a second camera, comprising:
   receiving a first input that is performed on a target position in a first preview picture collected by the first camera, and determining a movement speed of a target object according to a plurality of second preview pictures collected by the second camera;
   determining, according to the movement speed, a target time at which the target object moves into a target region, wherein the target region is obtained based on the target position and a size of the target object in the first preview picture, and the size of the target object in the first preview picture is determined based at least in part on sizes of the target object in the second preview pictures; and
   controlling the first camera to perform photographing the target region at the target time, wherein
   a position of the target object in each of the second preview pictures is different, and there is an overlapping picture between the first preview picture and each of the second preview pictures.

2. The method according to claim 1, wherein before the determining, according to the movement speed, a target time at which the target object moves into a target region, the method further comprises:
   determining an initial region according to the target position;
   determining the size of the target object in the first preview picture according to the sizes of the target object in the second preview pictures, a photographing parameter of the first camera, and a photographing parameter of the second camera; and
   adjusting the initial region, according to the size of the target object in the first preview picture, to obtain the target region.

3. The method according to claim 2, wherein the determining an initial region according to the target position comprises:
   determining, according to a slide trajectory of the first input in the first preview picture, a region surrounded by the slide trajectory as the initial region in a case that the first input is a slide input in the target position; or
   determining a region with a preset size centered on the target position as the initial region in a case that the first input is a click input in the target position.

4. The method according to claim 1,
wherein:
before the controlling the first camera to perform photographing at the target time, the method further comprises:
   controlling the first camera to focus on the target region; and
   performing photometry on the target region, to determine an exposure compensation value; and
the controlling the first camera to perform photographing at the target time comprises:
   controlling, at the target time, the first camera to perform exposure compensation according to the exposure compensation value and obtain a photograph.

5. The method according to claim 1,
wherein:
before the controlling the first camera to perform photographing at the target time, the method further comprises determining an exposure duration of the first camera according to the movement speed; and
the controlling the first camera to perform photographing at the target time comprises controlling, at the target time, the first camera to perform exposure according to the exposure duration and obtain a photograph.

6. The method according to claim 5,
wherein:
the electronic device stores a plurality of speed intervals and a plurality of exposure durations, wherein one speed interval corresponds to one exposure duration; and
the determining an exposure duration of the first camera according to the movement speed comprises:
   determining a target speed interval according to the movement speed, wherein the target speed interval is an interval to which the movement speed belongs of the plurality of speed intervals; and determining an exposure duration corresponding to the target speed interval as the exposure duration of the first camera.

7. The method according to claim 1, wherein the determining a movement speed of a target object according to a plurality of second preview pictures collected by the second camera comprises:

determining a first position, wherein the first position is a position of the target object in a second preview picture, and the second preview picture is a preview picture collected through the second camera at a first moment;

determining a second position, wherein:

the second position is a position of the target object in another second preview picture, the another second preview picture is a preview picture collected through the second camera at a second moment, and the second moment is a moment after the first moment; and determining the movement speed according to the first position, the second position, the first moment, and the second moment.

8. The method according to claim 7, wherein the determining, according to the movement speed, a target time at which the target object moves into a target region comprises:

determining a third position, wherein the third position is a position in the another second preview picture corresponding to the target region;

determining, according to the third position, the second position, and the movement speed, a movement duration during which the target object moves from the second position to the third position; and determining the target time according to the movement duration and the second moment.

9. An electronic device, comprising: at least a first camera and a second camera, a processor, a memory, and a computer program stored in the memory and executable on the processor, wherein the computer program, when executed by the processor, causes the electronic device to perform:

receiving a first input that is performed on a target position in a first preview picture collected by the first camera;

determining a movement speed of a target object according to a plurality of second preview pictures collected by the second camera;

determining, according to the movement speed, a target time at which the target object moves into a target region, wherein the target region is obtained based on the target position and a size of the target object in the first preview picture, and the size of the target object in the first preview picture is determined based at least in part on sizes of the target object in the second preview pictures; and controlling the first camera to perform photographing the target region at the target time determined by the determining module, wherein a position of the target object in each of the second preview pictures is different, and there is an overlapping picture between the first preview picture and each of the second preview pictures.

10. The electronic device according to claim 9, wherein the computer program, when executed by the processor, causes the electronic device to further perform:

determining an initial region according to the target position before the target time at which the target object moves into the target region is determined according to the movement speed;

determining the size of the target object in the first preview picture according to the sizes of the target object in the second preview pictures, a photographing parameter of the first camera, and a photographing parameter of the second camera; and adjusting, according to the size of the target object in the first preview picture, the initial region, to obtain the target region.

11. The electronic device according to claim 10, wherein the computer program, when executed by the processor, causes the electronic device to further perform:

determining, according to a slide trajectory of the first input in the first preview picture, a region surrounded by the slide trajectory as the initial region in a case that the first input is a slide input in the target position; or determining a region with a preset size centered on the target position as the initial region in a case that the first input is a click input in the target position.

12. The electronic device according to claim 9, wherein: the computer program, when executed by the processor, causes the electronic device to further perform:

controlling the first camera to focus on the target region before the first camera is controlled to perform photographing at the target time;

performing photometry on the target region, to determine an exposure compensation value; and controlling, at the target time, the first camera to perform exposure compensation according to the exposure compensation value and obtain a photograph.

13. The electronic device according to claim 9, wherein the computer program, when executed by the processor, causes the electronic device to further perform:

determining an exposure duration of the first camera according to the movement speed before the first camera is controlled to perform photographing at the target time; and controlling, at the target time, the first camera to perform exposure according to the exposure duration and obtain a photograph.

14. The electronic device according to claim 13, wherein:

the memory stores a plurality of speed intervals and a plurality of exposure durations, wherein one speed interval corresponds to one exposure duration; and the computer program, when executed by the processor, causes the electronic device to further perform:

determining a target speed interval according to the movement speed; and determining an exposure duration corresponding to the target speed interval as the exposure duration of the first camera, wherein the target speed interval is an interval to which the movement speed belongs of the plurality of speed intervals.

15. The electronic device according to claim 9, wherein the computer program, when executed by the processor, causes the electronic device to further perform:

determining a first position, wherein the first position is a position of the target object in a second preview picture, and the second preview picture is a preview picture collected through the second camera at a first moment;

determining a second position, wherein:
the second position is a position of the target object in another second preview picture,
the another second preview picture is a preview picture collected through the second camera at a second moment, and
the second moment is a moment after the first moment; and
determining the movement speed according to the first position, the second position, the first moment, and the second moment.

16. The electronic device according to claim 15, wherein the computer program, when executed by the processor, causes the electronic device to further perform:
determining a third position, wherein the third position is a position in the another second preview picture corresponding to the target region;
determining, according to the third position, the second position, and the movement speed, a movement duration during which the target object moves from the second position to the third position; and
determining the target time according to the movement duration and the second moment.

17. A non-transitory computer-readable storage medium, wherein the non-transitory computer-readable storage medium stores a computer program, and the computer program, when executed by a processor, causes the processor to perform:
receiving a first input that is performed on a target position in a first preview picture collected by a first camera, and determining a movement speed of a target object according to a plurality of second preview pictures collected by a second camera;
determining, according to the movement speed, a target time at which the target object moves into a target region, wherein the target region is obtained based on the target position and a size of the target object in the first preview picture, and the size of the target object in the first preview picture is determined based at least in part on sizes of the target object in the second preview pictures; and
controlling the first camera to perform photographing the target region at the target time, wherein a position of the target object in each of the second preview pictures is different, and there is an overlapping picture between the first preview picture and each of the second preview pictures.

18. The non-transitory computer-readable storage medium according to claim 17, wherein the computer program, when executed by the processor, causes the processor to further perform:
determining an initial region according to the target position;
determining the size of the target object in the first preview picture according to the sizes of the target object in the second preview pictures, a photographing parameter of the first camera, and a photographing parameter of the second camera; and
adjusting the initial region, according to the size of the target object in the first preview picture, to obtain the target region.

19. The non-transitory computer-readable storage medium according to claim 18, wherein the determining an initial region according to the target position comprises:
determining, according to a slide trajectory of the first input in the first preview picture, a region surrounded by the slide trajectory as the initial region in a case that the first input is a slide input in the target position; or
determining a region with a preset size centered on the target position as the initial region in a case that the first input is a click input in the target position.

20. The non-transitory computer-readable storage medium according to claim 17, wherein the computer program, when executed by the processor, causes the processor to further perform:
before controlling the first camera to perform photographing at the target time:
controlling the first camera to focus on the target region; and
performing photometry on the target region, to determine an exposure compensation value; and
controlling the first camera to perform photographing at the target time further comprises:
controlling, at the target time, the first camera to perform exposure compensation according to the exposure compensation value and obtain a photograph.

* * * * *